United States Patent [19]

Guim et al.

[11] Patent Number: 5,461,360
[45] Date of Patent: Oct. 24, 1995

[54] KEY SENSOR ALARM FOR DOOR LOCKS

[76] Inventors: Raul Guim; Elena Guim, both of 834 Venetia, Coral Gables, Fla. 33134

[21] Appl. No.: 310,577

[22] Filed: Sep. 22, 1994

[51] Int. Cl.$^6$ ..................................................... B60Q 1/00
[52] U.S. Cl. ................... 340/457; 70/DIG. 49; 340/542; 340/568
[58] Field of Search ................... 340/457, 568, 340/542; 70/DIG. 49

[56] References Cited

U.S. PATENT DOCUMENTS

| | | | |
|---|---|---|---|
| 2,847,656 | 8/1958 | Ricks | 340/457 |
| 3,579,183 | 5/1971 | Lipschutz | 340/457 |
| 4,652,865 | 3/1987 | Maharshak | 340/568 |
| 4,758,819 | 7/1988 | Kuribayashi | 340/568 |
| 4,864,279 | 9/1989 | Cooper | 340/568 |
| 4,868,559 | 9/1989 | Pinnow | 340/825.31 |
| 4,985,693 | 1/1991 | Sunami | 70/DIG. 49 |
| 5,051,724 | 9/1991 | Morrow et al. | 340/568 |
| 5,113,174 | 5/1992 | Wake | 340/457 |

FOREIGN PATENT DOCUMENTS

| | | | |
|---|---|---|---|
| 2048421 | 2/1993 | Canada | 340/568 |

*Primary Examiner*—Brent A. Swarthout
*Attorney, Agent, or Firm*—McHale & Slavin

[57] ABSTRACT

A key reminder device for use in combination with a key lock mechanism having an adjustable timer with a predetermined timer interval electrically coupled to a replaced power supply. The timer is energized upon detection of a conventional key inserted into the key lock mechanism. Should the key remain in the key lock mechanism beyond a predetermined time, the timer will activate an audible alarm to remind the owner of the keys to remove them. Should the timer be set at a low level, the device operates to indicate the presence of a key. When used in combination with a visual indicator, the key reminder provides an indicator of door entry to the hearing impaired.

1 Claim, 1 Drawing Sheet

KEY SENSOR ALARM FOR DOOR LOCKS

FIELD OF THE INVENTION

This invention relates generally to alarm devices and, in particular to an alarm device used in conjunction with a door lock for indication of the extended presence of a key.

BACKGROUND OF THE INVENTION

Safe keeping of a home or business is a primary concern for the occupants thereof. Business offices are frequently broken into where computers, facsimile machines, telephones and the like equipment can be easily resold. It is also well known that dwellings are frequently burglarized causing the occupants fear and grief to find precious heirlooms stolen as well as televisions, stereos, cameras, and so forth taken from their lawful premises.

For these reasons elaborate alarm systems have been developed providing the occupant with a secure feeling that the premises are being guarded. A problem with the security of homes and businesses is the reliance on the human interface which is required to enable or disable the device. Despite the advances in alarm systems and locking mechanisms, unless the security device is enabled it is worthless. Further, should the occupant provide a potential burglar with the device necessary for unlocking the security mechanism, there is no security made possible by any device.

Thus, a primary level of security remains the conventional mechanical lock found on most every door that requires security. Typically the lock consists of a door handle with an integrated key lock requiring the occupant to unlock the door handle before the door can be opened. Another key lock for doors is commonly referred to as a dead bolt lock consisting of a solid bolt that engages a door jam. Should a person leave a key in a lock, the key becomes the unlocking mechanism, and if placed in the wrong hands has dire consequences. Statistics show that this event is very common and is the preferred method of potential burglars so as to avoid the need to defeat an alarm that is beyond the thieves + capability.

Occupants to a home or business frequently leave their keys in the locking mechanism in their haste to enter the dwelling. For instance, it is not uncommon for a person to attempt to carry groceries into a home leaving the keys in the door lock until they have set down the groceries and subsequently forgetting to retrieve the keys. In this event, a potential thief can simply grab the keys and use them later to gain uninhibited access to the dwelling. Similarly, a worker who opens an office can easily leave their keys in the door while they prepare for the morning's business. Again, a potential thief can easily grab the keys and use them later. A clever thief has even been known to make a copy of the key and return the key to a conspicuous location so that the rightful owner believes they have simply misplaced the keys and thus does nothing further to rectify their security breach. If the occupant of the dwelling forgets the keys they may simply think they have misplaced them and will duplicate keys as their replacement. Even if the rightful owner of the stolen keys realizes that they are stolen, they may not believe it is worth the expense to change all the locks that are associated with the lost keys. For example, a key ring may include keys to a person's home, office, automobile, neighbor's home, parents' home, boat, and so forth. A person may not be able to afford to quickly change every lock at every location. They may further avoid telling the person whose key was in their possession that their key was stolen, leaving the entrusting persons susceptible to home invasion.

Therefore, what is needed in the art is a device capable of reminding the owner of keys that they remain within the locking mechanism.

SUMMARY OF THE INVENTION

The instant invention is a key insertion reminding device which operates to signal an alarm should a key be left within a key slot for longer than a predetermined time limit. The preferred embodiment includes a micro-switch located within the key lock mechanism that is triggered upon insertion of a conventional key. Once the micro-switch is triggered it activates an adjustable timer which counts down a time suggested within five to twenty five seconds wherein if the key is not removed within that time limit an audible alarm is sounded. The micro-switch can be replaced with a photo optic sensor which can be placed within the key latch mechanism. These embodiments are well suited for new applications or replacement of existing key lock mechanisms allowing the sensing device of the instant invention to be incorporated directly into the locking mechanism.

An alternative embodiment allows for placement of the sensing mechanism external the door and can be simply secured in a position around conventional locks such as a dead bolt. In this embodiment a circular O-ring is placed around the conventional lock mechanism wherein the enlarged ring has a photo sensing device along a raised lip which must be broken upon insertion of the key. As with the aforementioned embodiment should the key not be removed within a predetermined amount of time an audible alarm will be sounded so that the person will retrieve the keys from the lock.

The instant invention is well suited for those persons who are extremely busy and most likely to forget the basic necessities of removing the keys from a door lock as they have more important things on their mind. It further provides a reminder for those persons who may not realize the necessity of removing keys from a door lock such as young children who are entrusted with an important key or the elderly who may be partially incapacitated due to an illness.

Thus, an objective of the instant invention is to provide an inconspicuous alarm that will indicate the extended presence of a key within a key lock mechanism.

Another objective of the instant invention is to provide the occupants of a premise with the increased security by alarming the rightful owners to the premise that the security keys remain available to potential thieves.

Yet another objective of the instant invention is to teach young children the importance of removing keys from the key lock mechanism by providing an instant reminder that the keys present a breach of security.

Still another objective of the instant invention is to provide an integrated key alarm mechanism that fits within the cavity of a security door providing ease of installation and operation.

A further objective of the instant invention is to provide an alternative embodiment wherein the alarm mechanism is attachable to the external facia of a security door for placement about a dead bolt key lock mechanism.

Another objective of the instant invention is to provide a low cost alarm mechanism that will provide visual indication of key insertion as a primary alert to the hearing impaired.

Other objectives and advantages of this invention will become apparent from the following description taken in conjunction with the accompanying drawings wherein are set forth by way of illustration and example, certain embodiments of this invention. The drawings constitute a part of the specification and include exemplary embodiments of the present invention and illustrate various objects and features thereof.

DETAILED DESCRIPTION OF THE PREFERRED EMBODIMENT

Figure 1:
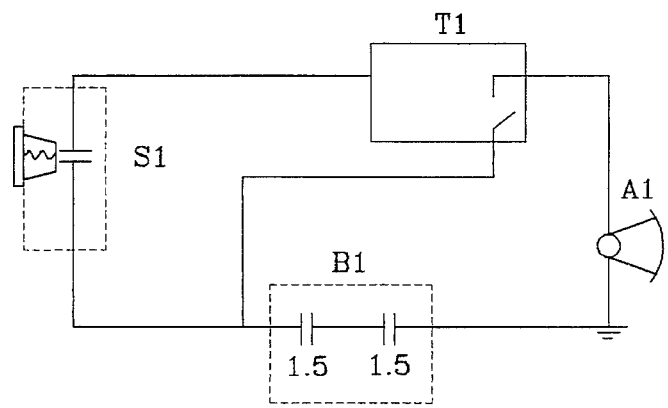
FIG. 1 is an electrical schematic of the instant invention.

Now referring to FIG. 1 shown is a simplified electrical diagram of the instant invention. The primary intent of the invention is to detect a key left in a key hole by activating an audible alarm if the key is left in the lock mechanism for an extended period of time. T1 depicts a timer such as an LM-555 or equivalent timer having an adjustable timing circuit electrically coupled to a power supply B1. The power supply B1 is preferably disposable such as 1.5 volt lithium AA battery placed in series for a combined 3 volts. A means for detecting S1 the insertion of a key within a key lock mechanism initiates the timer T1. A micro-switch can be incorporated into the locking mechanism as further described later in this specification.

The means for detecting may also be an optical sensor or magnetic switch. In any event when S1 is closed by insertion of a key, the timer circuit T1 is adjusted between five and twenty seconds. Once a key is inserted into the switch S1 the timer mechanism T1 begins to countdown from the predetermined time and should the key remain in a position of switch S1 activation, the timer T1 will time out activating an audible alarm A1 operatively associated with the timer T1.

Figure 2:
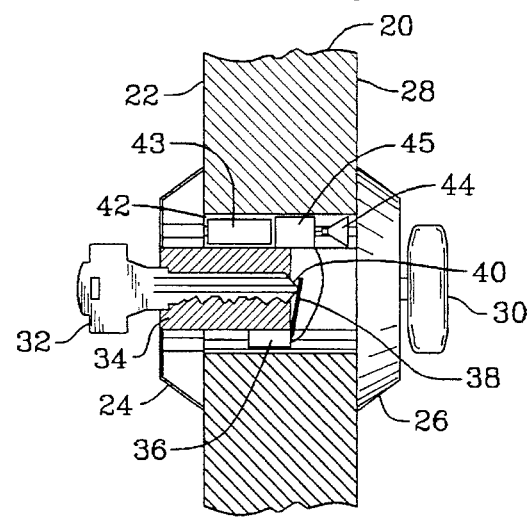
FIG. 2 is a cross-sectional pictorial view of a key inserted into a key lock mechanism.

Referring now to FIG. 2 shown is a pictorial view of an embodiment of the alarm system of the instant invention installed within a key lock mechanism. Depicted in a cross-sectional view of a door 20 having a outer side surface 22 having an external key insertions lock mechanism 24 coupled to an inner key bolt lock shield 26 disposed along the inner side surface 28 of the door 20. In this embodiment the locking mechanism is commonly referred to as a dead bolt having a lever 30 for operation which allows the door to be locked by simple twisting of the lever 30. It should be noted that the figure sets forth a dead bolt for illustration only as the invention works equally well with any locking mechanism including those integrated into a door handle.

When the lock mechanism is engaged, a latch locks the door to an adjoining door frame to prevent entrance to the dwelling. Insertion of key 32 into an available slot in the outer lock mechanism 24 allows engagement to a coded key tumbler mechanism 34 which will only allow turning of the key 32 if the components are keyed alike. Micro-switch 36 is coupled to the internal locking mechanism 34 with engagement bar 38 which places the micro-switch 36 into a closed position when the tip 40 of the key 32 engages the micro-switch arm 38. The remaining electrical components are similarly placed within the door cavity in enclosure 42 which houses the battery(s), audible speaker 44, and timer mechanism 45.

Once the key 32 is inserted into the locking mechanism 34 and the micro-switch 36 is engaged, the timer 45 receives power from the batteries 42 and should the timer count down before the key 32 is removed from the lock mechanism 34, the audible alarm 44 will signal. Lithium batteries contained within the enclosure provide optimum life as the system need only be made operable should the key remain in the key lock mechanism for prolonged period of time. Circuitry includes indication of low battery power by providing an audible signal through the speaker. It should be noted that arrangement of the particular components is not limited to the particular order shown and described as the cavity for the lock mechanism provides sufficient room for rearrangement of components without defeating the purpose of this invention. The micro switch 36 can substituted with an optical sensor or magnetic pick-up.

Figure 3:
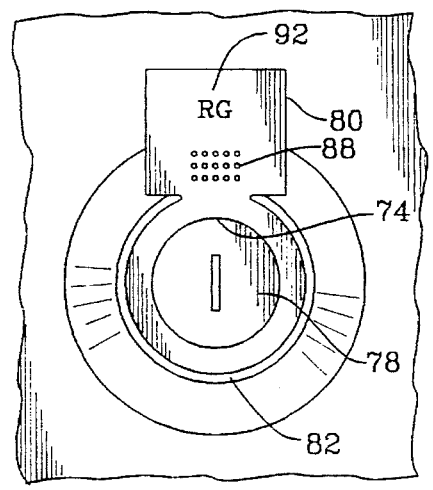
FIG. 3 is a front view of an optical sensor embodiment of the instant invention.
Figure 4:
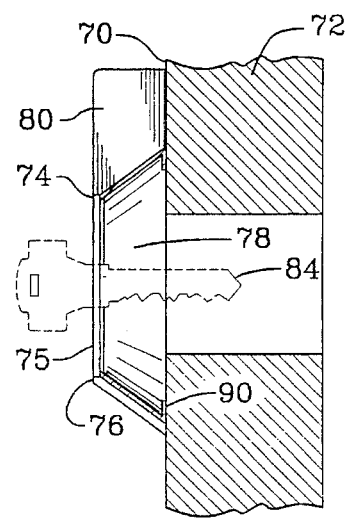
FIG. 4 is side view of FIG. 3 with a key inserted by hidden lines for a pictorial display thereof.

Referring to FIGS. 3 and 4, set forth an embodiment of the instant invention wherein the aforementioned components are placed within a housing secured to the outer surface 70 of a door 72. In this embodiment an optical sensor is substituted for the aforementioned micro switch. Art emitter 74 directs an infrared beam 75 for receipt by receiver 76 located at the opposite end of the lock mechanism 78 surface. The optical sensor is located in housing 80 defined by a square shaped enclosure leading to a circular enclosure 82 which encompasses the locking mechanism. When a key 84 is inserted into the locking mechanism 78, the key breaks the infrared beam 75 of light causing the receiver 76 to close and provide power to the timer located in the housing 80 thus allowing the timer to countdown in the aforementioned manner. Should the key 84 remain in the key lock mechanism 78 beyond the predetermined period of time, preferably between five and twenty seconds, an audible alarm located within the housing 80 beneath screen openings 88 will provide an audible alarm. The alarm can be a piezo or the like audible alarm.

The housing 80 can be attached to the outer surface 70 of the door 72 by adhesive or more preferably the housing 80 and circular enclosure 82 includes a tab 90 which fits beneath the lock mechanism 78 cover shield allowing a secure installation by simply loosening the lock mechanism 78 for insertion of the support tabs 90 beneath the lock mechanism 78. The lock mechanism 78 cover shield is secured by engagement screws located on the inner side surface of the lock mechanism.

The housing 80 and associated circular ring structure 82 can be constructed of low cost thermal plastic. Alternatively, the housing and structure can be made from a high gloss material such as brass and include ornamental indicia 92 such as the monogram of the occupant placed along the front surface of the housing 80.

One skilled in the art will recognize that the components in the housing can be relocated such as within the cavity of the door yet maintain the external optical support structure 82. Similarly, the housing 80 may remain external to the door for ease of battery replacement while the micro switch, optical sensor, or magnetic pick-up is located within the door cavity.

The audible alarm may be exchanged for any type of indicating device such as light and may be further coupled into a security alarm system. For the hearing impaired, the presence of a key being inserted into the door provides an early indication that someone is entering the doorway. For this reason, the timer can be set at a low level or removed from the circuit.

It is to be understood that while we have described certain forms of our invention, it is not to be limited to the specific forms or arrangement of parts herein described and shown. It will be apparent to those skilled in the art that various changes may be made without departing from the scope of the invention and the invention is not to be considered limited to what is shown in the drawings and described in the specification.

What is claimed is:

1. A concealed key reminder device providing an alarm upon the failure to timely withdraw a key out of a key lock mechanism mounted in a door cavity of a residential or commercial door, said key lock mechanism securing the door in a fixed position when said key lock mechanism is placed in a locked position, said key lock mechanism defined by a key slot receptive to a key having a complimentary surface operatively associated with said key lock mechanism allowing for the locking and unlocking of the door, said device comprising;

a normally open micro-switch having a first contact and a second contact, said micro-switch coupled to concealed portion of said key lock mechanism in the cavity of the door;

a trigger arm operatively associated with said micro-switch having a proximal end hingedly secured to said micro-switch and distal end positioned across a portion of said key slot, said distal end movable by a leading end of a key inserted into said key slot which causes the engagement of said first and second contacts;

a replaceable power supply electrically coupled to said first contact of said micro-switch; means for providing an audible indication of low power;

a timer means electrically coupled to said second contact of said micro-switch, said timer means having an adjustable timer interval initiated upon coupling to said power supply; and a piezo electric speaker electrically coupled to said timer means producing an audible alarm upon completion of said timer interval;

wherein insertion of a key into said key lock mechanism moves said distal end of said trigger arm completing an electrical contact between said power supply causing operation of said piezo electric speaker after a period of time if the key remains in said key lock mechanism; said audible alarm indicating a key left in lock condition if a timer interval adjusted to a first high level has expired, and indicating arrival of a person at the door when a timer interval adjusted to a second low level substantially less than said first level has expired.

* * * * *